United States Patent
Nivet

(10) Patent No.: US 6,771,037 B2
(45) Date of Patent: Aug. 3, 2004

(54) ACTUATOR AND FAMILY OF ACTUATORS FOR A SEAT AND METHOD OF MANUFACTURING SUCH AN ACTUATOR

(75) Inventor: Laurent Nivet, Asnieres (FR)

(73) Assignee: Messier-Bugatti, Velizy (FR)

( * ) Notice: Subject to any disclaimer, the term of this patent is extended or adjusted under 35 U.S.C. 154(b) by 53 days.

(21) Appl. No.: 10/251,987

(22) Filed: Sep. 23, 2002

(65) Prior Publication Data

US 2003/0057910 A1 Mar. 27, 2003

(30) Foreign Application Priority Data

Sep. 26, 2001 (FR) .............................. 01 12392

(51) Int. Cl.⁷ .................................................. B60N 2/02
(52) U.S. Cl. .................. 318/663; 318/568.23; 318/626; 318/632; 318/652
(58) Field of Search ........................... 318/565, 568.22, 318/568.23, 626, 632, 638, 652, 663, 668, 264, 265, 266, 286, 466, 468, 470

(56) References Cited

U.S. PATENT DOCUMENTS

| | | | |
|---|---|---|---|
| 4,706,194 A | | 11/1987 | Webb et al. |
| 5,253,138 A | | 10/1993 | Droulon et al. |
| 6,194,853 B1 | | 2/2001 | Tual et al. |
| 6,502,048 B1 | * | 12/2002 | Lichtinger et al. .......... 702/101 |
| 6,513,799 B2 | * | 2/2003 | St.Clair ...................... 267/131 |

FOREIGN PATENT DOCUMENTS

FR 2 512 567 3/1983

* cited by examiner

*Primary Examiner*—Bentsu Ro
(74) *Attorney, Agent, or Firm*—Stites & Harbison PLLC; Douglas E. Jackson

(57) ABSTRACT

The invention relates to an actuator (22) for a seat, of the type comprising, on the one hand, a body (40) and a control element (38) displaceable relative to the body (40), under the control of an actuating motor (36), and, on the other hand, a transducer (42) disposed between the body (40) and the control element (38), said transducer (42) being suitable for providing a raw measurement value representative of the current position of the control element (38) relative to the body (40). It has a unit (46) for correcting said raw measurement value, said correction unit (46) being suitable for implementing a correction algorithm which is specific to said actuator and which is suitable for providing a corrected value for the current position of the actuator on the basis of said raw measurement value. Said correction unit (46) is specific to said actuator and is integrated therein.

16 Claims, 6 Drawing Sheets

US 6,771,037 B2

ACTUATOR AND FAMILY OF ACTUATORS FOR A SEAT AND METHOD OF MANUFACTURING SUCH AN ACTUATOR

TECHNICAL FIELD

The present invention relates to an actuator of the type comprising, on the one hand, a body and a control element which can be displaced relative to the body, under the control of an actuator motor and, on the other hand, a transducer disposed between the body and the control element, said transducer being designed to provide a raw measurement value representative of the current position of the control element relative to the body.

BACKGROUND TO THE INVENTION

In order to improve the comfort of the user, many seats are nowadays fitted with electrical actuating devices enabling the configuration of the seat to be modified by displacing moveable elements thereof. In particular, such seats are used especially in transport vehicles such as aircraft, boats and railway carriages.

It is common for every seat to have a reclining back, articulated about one end of a seat-part, as well as a leg rest, articulated about the other end of the seat-part. Both the back and the leg rest can be displaced under the control of an actuating device between a substantially vertical position and a substantially horizontal position, thereby enabling the seat to assume several configurations. For example, these configurations include a configuration in which the user is in a sleeping position, when the back and the leg rest are both substantially horizontal, and a sitting configuration, in which the leg rest and the back are both substantially vertical.

An actuating device is provided so that each moveable element of the seat can be directly and independently controlled.

In addition, many seats are fitted with devices which enable the leg rest and the foot rest to be moved simultaneously by a single command, in order to place the seat in a predetermined configuration with a single command.

For each of these predetermined configurations of the seat, a predetermined target position is fixed for each seat element and hence each actuator.

So that the position of the different seat elements is known at every instant, thereby enabling their displacement to be readily managed, a known approach is to provide in the actuating devices of the seat elements a transducer, such as a potentiometer, enabling raw measurement values representative of the current position of each actuator to be gathered.

A predetermined target value is stored in memory for each of the predetermined seat configurations accessible by a single actuating device, this predetermined target value being equal to the raw measurement value sensed when the seat element is in the desired target position.

Accordingly, to move a seat element towards a predetermined position, the actuator is operated until the current raw measurement value provided by the transducer is equal to the predetermined target value corresponding to the intended position of the actuator and hence the corresponding seat element.

Furthermore, in order to prevent a moveable element of the seat from encountering an obstacle, a known approach is to track the position of this moveable element and prevent the raw measurement value provided by the transducer from exceeding a predetermined threshold value. If the raw measurement value provided by the transducer is equal to this predetermined threshold value, a command to stop the actuator is automatically issued, independently of the control operated by the passenger.

In practice, it has been found that, because of manufacturing tolerances in actuators and mechanical and electronic inaccuracies in transducers, identical actuators do not all provide the same raw measurement value for a same actuator position.

Consequently, when a faulty actuator is replaced by a new actuator, the seat has to be re-programmed, otherwise the response of the seat to a user operation may not be satisfactory owing to the tolerances and inaccuracies of the actuator.

The object of the invention is to propose an actuator for a seat element, which will enable the actuator to be readily replaced with another, without any malfunctions of the seat occurring.

SUMMARY OF THE INVENTION

To this end, the invention relates to an actuator for a seat element of the type outlined above, characterised in that it has means for correcting said raw measurement value, said correction means being suitable for defining a correction algorithm which is specific to said actuator and which is suitable for providing a corrected value for the current position of the actuator on the basis of said raw measurement value, and in that said correction means are specific to said actuator and are integrated therein.

Depending on the embodiment, the actuator may incorporate one or more of the following features:

said correction means have a correction unit specific to said actuator and integrated in said actuator, said correction unit having means for storing said correction algorithm when the actuator is manufactured and a data processing unit suitable for providing said corrected value by implementing the stored correction algorithm on the basis of said raw measurement value;

said correction means have means for storing parameters for defining said correction algorithm and means for transmitting said defining parameters to a control unit of the actuator capable of implementing the correction algorithm on the basis of said defining parameters;

the actuator is isolated from a seat before being mounted on the seat;

said correction algorithm depends solely on the structural characteristics specific to said actuator and is independent of the structure of the seat for which it is intended; and said correction algorithm is suitable for calculating the corrected value as the image of the raw measurement value by means of an affine correction function.

The invention further relates to an actuating system characterised in that it has at least one actuator as defined above and a control unit for the or each actuator, which control unit is linked to the or each actuator so as to receive from the or each actuator the raw measurement value and said defining parameters of the algorithm, and in that the control unit has a data processing unit suitable for providing said corrected value on the basis of said raw measurement value by implementing the correction algorithm on the basis of said received parameters defining the algorithm.

The invention further relates to a family of actuators comprising several actuators as defined above and the correction algorithm of each actuator is such that, for at least one predetermined relative position of the control element by reference to the body, said corrected values provided by all the actuators of the family are equal to a same predetermined value.

Depending on the embodiments:

the correction algorithm of each actuator is such that, for at least two predetermined relative positions of the control element by reference to the body, said corrected values provided by all the actuators of the family are equal to a same predetermined value;

the correction algorithm specific to each actuator is such that the discrepancy between the corrected values provided by the actuators of the family for any set of identical positions of the actuators is smaller than the discrepancy between the raw measurement values provided by the transducers of the same actuators for the same set of identical positions of the actuators.

Finally, the invention relates to a method of manufacturing an actuator intended to be mounted in a seat, the actuator comprising, on the one hand, a body and a control element which can be moved relative to the body, under the control of an actuating motor, and, on the other hand, a transducer disposed between the body and the control element, said transducer being suitable for providing a raw measurement value representative of the current position of the control element relative to the body, characterised in that means for correcting said raw measurement value are integrated in the actuator, said correction means being suitable for defining a correction algorithm which is specific to said actuator and which is suitable for providing a corrected value for the current position of the actuator on the basis of said raw measurement value, and in that it includes a phase during which the correction algorithm defined by said correction means is customised for the specific actuator before the actuator is mounted on the seat.

In particular, said phase of customising the correction algorithm includes the steps of:

positioning the control element relative to the body in at least one predetermined position;

reading the raw measurement value provided by the transducer for the or each predetermined position; and determining the correction algorithm on the basis of the or each raw measurement value read.

BRIEF DESCRIPTION OF DRAWINGS

The invention will be more readily understood from the description below, given by way of example only, and with reference to the drawings, of which.

DESCRIPTION OF PREFERRED EMBODIMENTS

Figure 1:
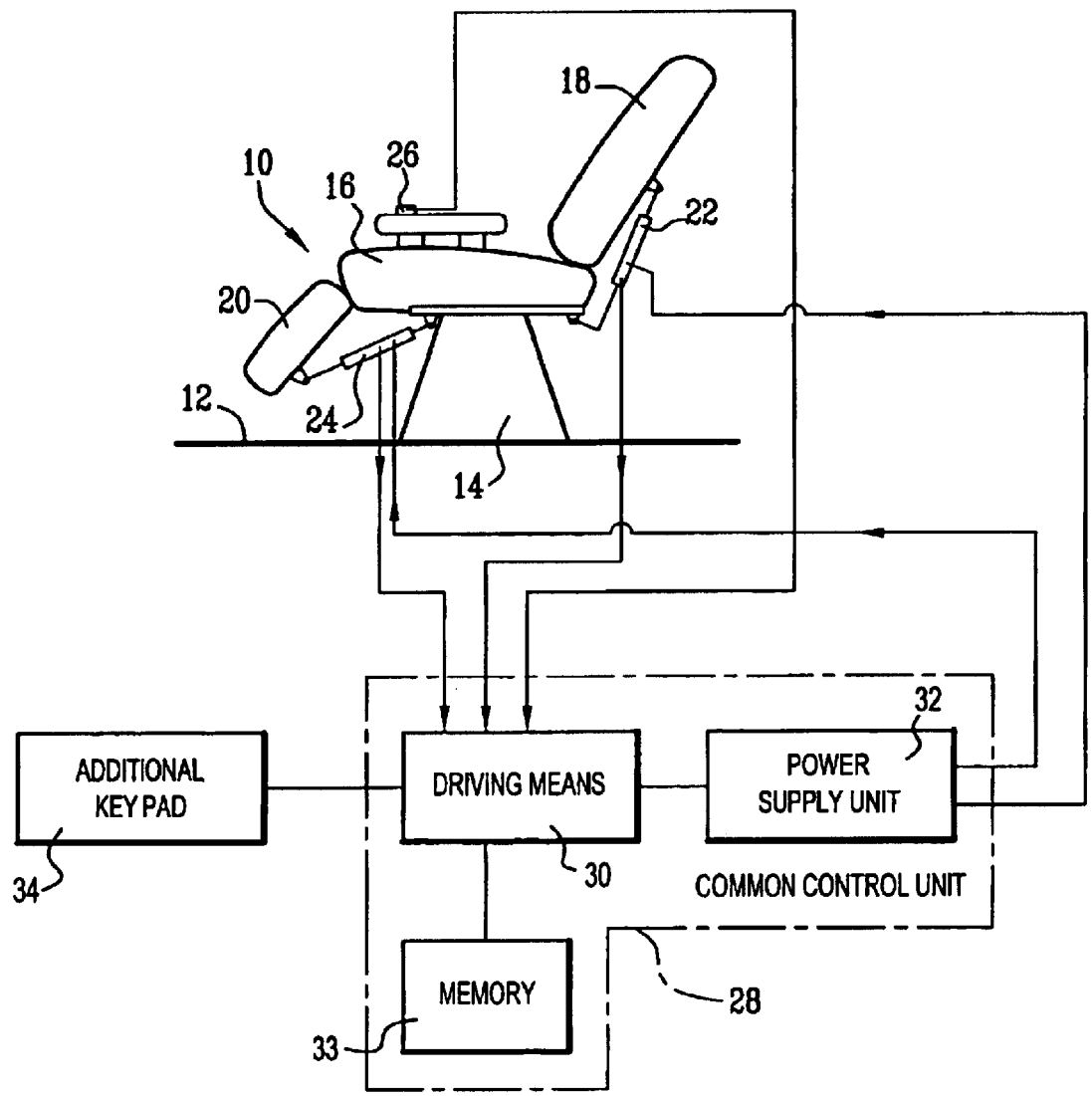
FIG. 1 is a schematic side view of a seat fitted with two actuators as proposed by the invention.

The seat 10 illustrated in FIG. 1 is an aircraft passenger seat. This seat is secured to the floor 12 of the aircraft. The seat 10 has a pedestal 14 fixed to the floor 12, on which a substantially horizontal seat-part 16 rests. Articulated about one end of the seat-part 16 is a back 18, which can be displaced between a substantially vertical position and a substantially horizontal position, in which it becomes an extension of the seat-part 16.

Articulated about the other end of the seat-part 16 is a leg rest 20, displaceable between a substantially vertical folded-down position underneath the seat-part 16 and a substantially horizontal, extended position forming an extension of the seat-part 16.

A first actuator 22 is mounted between the seat-part 16 and the back 18 to allow the latter to be displaced between its vertical position and its horizontal position.

Similarly, a second actuator 24 is mounted between the seat-part 16 and the leg rest 20 to allow the latter to be displaced between its folded-down position and its extended position.

A key pad 26 or any other control element is fixedly joined to the seat to enable the user to control each actuator of the seat separately and directly. The key pad also enables the seat to be placed in several predetermined configurations by a single command acting on several actuators. These configurations include, for example, a meal configuration, a landing configuration and a sleeping configuration.

Each actuator 22, 24 is supplied with electric power from a common control unit 28. This unit 28 is separately linked to each of the actuators 22, 24 so that they can be controlled independently.

Furthermore, each actuator is linked to the control unit 28 so as to transmit to it a corrected value for the current position of the actuator in question.

The key pad 26 is also linked to the control unit 28 so that the actuators can be controlled on the basis of input commands.

In order to control the seat, the control unit 28 has driving means 30, to which the key pad 26 and the two actuators 22 and 24 are linked. Each of the latter continuously supplies the driving means 30 with a corrected value representative of their current position.

The control unit 28 also has a power supply unit 32 for the actuators 22 and 24, which is connected to the driving means 30. The unit 32 is suitable for supplying the actuators 22 and 24 with electric power on the basis of command instructions received from the driving means 30. In particular, the electric current supplied by the power supply unit 32 is adapted to a rating that will enable the actuators to operate at a satisfactory speed and is adapted to provide a current in a form that will enable the actuator to be displaced in the desired direction.

The control unit 28 also has a memory 33 linked to the driving means 30. Predetermined threshold values, generally denoted by $P_{pred}$, corresponding to the target positions to be assumed by the seat elements when the seat is moved into a predetermined configuration, are stored in the memory.

Accordingly, several predetermined threshold values are stored for each seat element. Each predetermined threshold value corresponds to a target position for a seat element, this target position being defined for a predetermined configuration of the seat.

Furthermore, two other predetermined threshold values, denoted by $P_{min}$ and $P_{max}$, are stored in the memory 33 for each actuator. These predetermined threshold values are displacement limit values and correspond to the end positions permitted for the actuator in the seat and thus define its range of displacement for the seat in question.

The memory 33 is re-writeable under the control of the driving means 30 of the central unit. In particular, these means 30 are in a form such that, on receiving an appropriate command instruction issued, for example, from an additional removable key pad 34, the predetermined threshold values for each actuator are stored in the memory 33.

The driving means 30 are suitable for performing comparisons between the corrected values of current positions received from the actuators and the predetermined threshold values stored in the memory 33.

The actuators 22 and 24 have substantially the same structure. A schematic illustration of one of them is provided in FIG. 2.

Accordingly, an actuator, for example 22, has a geared motor unit 36 which is associated in a manner known per se, for example by means of a screw-nut arrangement 37, with a rod 38 displaceable in translation relative to a housing 40, in which the geared motor unit is fixed. The rod 38 has a free end with an orifice 38A running through it for the link to a seat element. Similarly, the housing 40 has a tab 40A providing a link to another seat element.

A potentiometer 42 or any other type of appropriate transducer is fixed to the housing 40. A slider 44 of the potentiometer is fixedly joined to one end of the rod 38 of the actuator.

As proposed by the invention, each actuator additionally has its own unit 46 for correcting the raw measurement values provided by the potentiometer 42. These raw measurement values are representative of the current position of the actuator. In this particular instance, the raw measurement value is the resistance value of the potentiometer.

The correction unit 46 is suitable for receiving a raw measurement value at its input and for providing a corrected value of the position of the actuator at its output. This corrected value is sent to the control unit 28, to which the correction unit 46 of the actuator is linked.

The correction unit 46 is integrated in the actuator, i.e. it is fixedly joined to the body thereof and is replaced at the same time as the actuator if the latter has to be replaced.

The correction unit 46 has a data processing unit 47, provided in the form of a micro-controller, for example. The correction unit 46 additionally has memory means 48 linked to the data processing unit 47. These memory means 48 are suitable for memorising a correction algorithm implemented by the data processing unit 47. In particular, this algorithm comprises a correction function specific to the actuator, preferably an affine function enabling a corrected value for the position of the actuator to be determined on the basis of each raw measurement value received.

A communication interface 49 is provided in the correction unit 46 to establish a link between this unit and removable calibration means 50. The interface 49 is linked to the data processing unit 47.

The calibration means 50 are provided in the form of a computer, for example.

These calibration means 50 are used only during the manufacture of the actuator. They implement a calibration algorithm enabling especially the affine correction function specific to the actuator to be determined and memorised.

Figure 3:
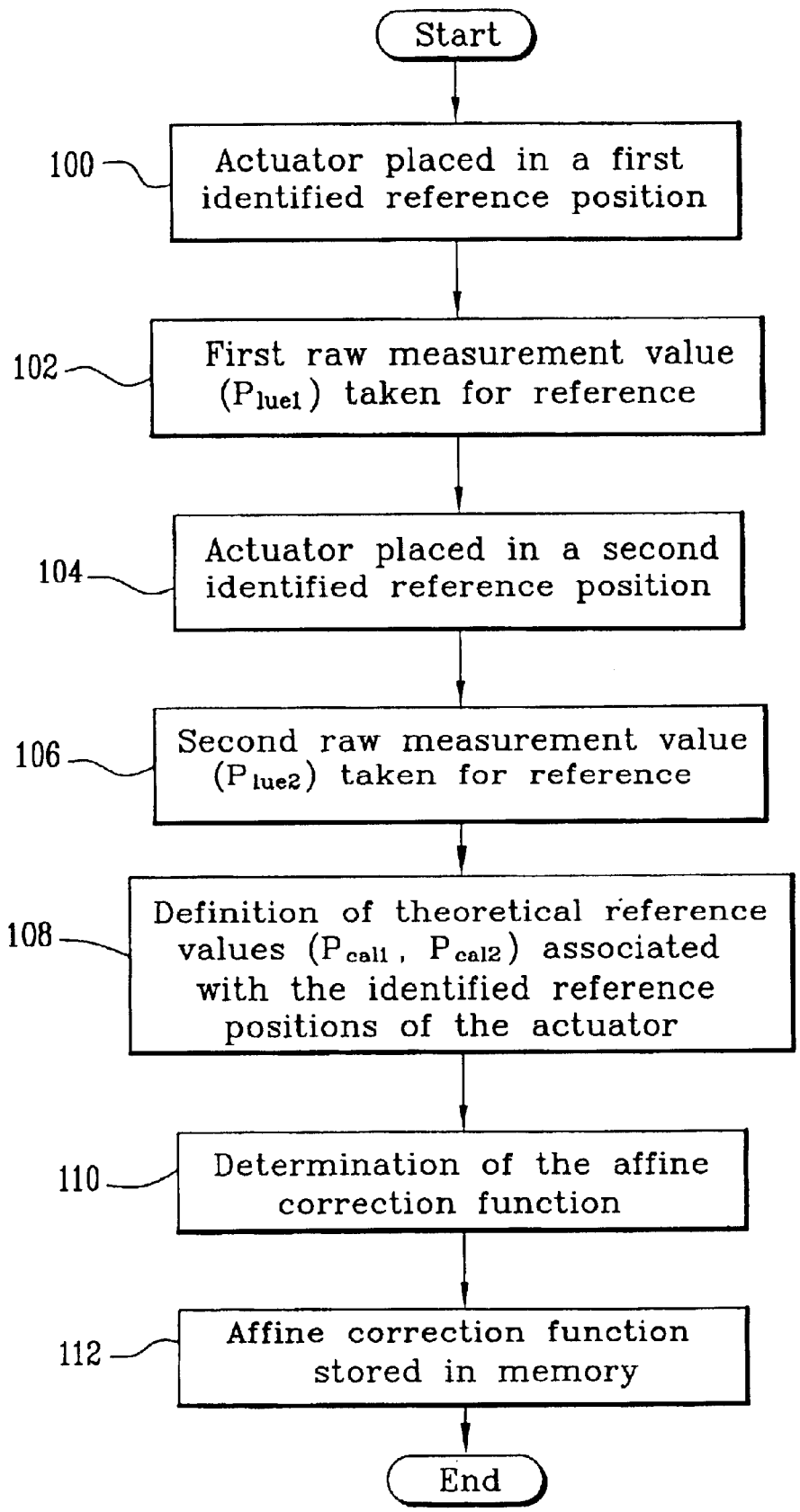
FIG. 3 is a flow chart illustrating the process used to calibrate an actuator as proposed by the invention.

The calibrating algorithm will now be described with reference to FIG. 3. The same algorithm is implemented for all the actuators of a same family of actuators, this family grouping all actuators that are identical in terms of function and size, except for tolerances. In particular, all the actuators of a same family are interchangeable.

Moreover, for a same position, all the actuators of a same family provide identical or substantially identical corrected measurement values, even if the raw measurement values provided by the transducers of the actuators are different.

The calibration phase of the actuator is carried out in the factory, before the actuator is delivered to the seat manufacturer. This calibration phase represents the final phase of manufacturing the actuator.

Figure 2:
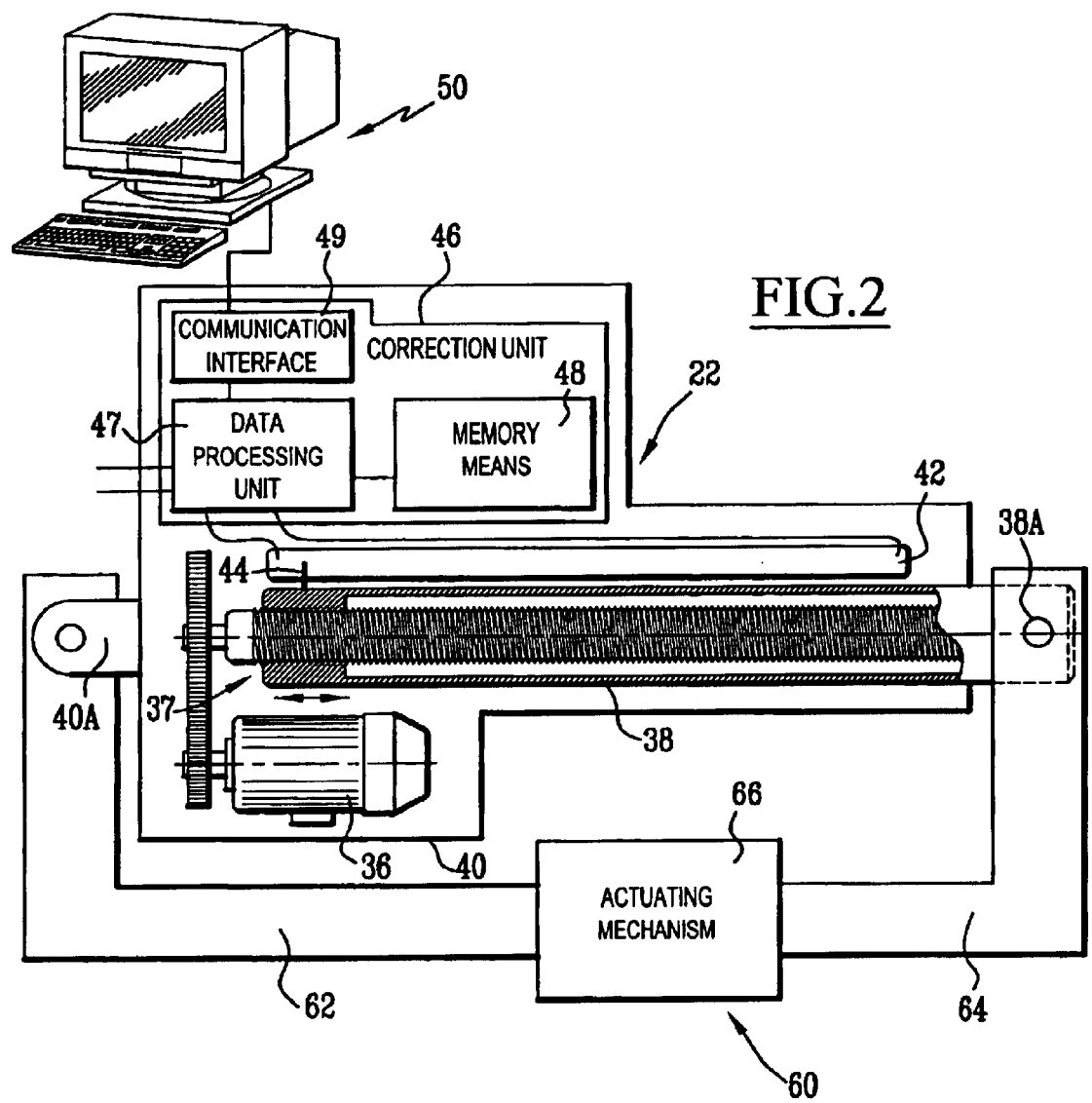
FIG. 2 is a schematic view of an actuator as proposed by the invention, during the calibration process.

For calibration purposes, and as illustrated in FIG. 2, the actuator is fitted on a dummy 60 having two mobile arms 62, 64, displaceable in translation relative to one another under the control of an actuating mechanism 66. The housing 40 of the actuator is linked to the first mobile arm 62 via the tab 40A, whilst the rod 38 of the actuator is linked to the second mobile arm 64 of the dummy from its end 38A.

The dummy is programmed to move the actuator into two predetermined and identified reference positions, each position being defined by a given distance between the ends of the first and second mobile arms.

These predetermined reference positions of the dummy 60 advantageously correspond to the end operating positions of the actuator.

At step 100, the actuator is shifted into the first identified reference position. This position is defined and imposed by the dummy 60. At step 102, by depressing a predetermined button of the calibration means 50, a first raw measurement reference value, denoted by $P_{lue1}$, is sensed by the potentiometer 42 of the actuator. This value is transmitted to the calibration means 50, where it is temporarily memorised.

At step 104, the actuator is then moved into the second identified reference position. This position is defined and imposed by the dummy 60.

At step 106, by depressing a predetermined button of the calibration means 50, a second raw measurement reference value, denoted by $P_{lue2}$, representative of the position of the actuator in its second identified reference position, is recorded by the calibration means 50.

At step 108, theoretical reference values, denoted by $P_{cal1}$ and $P_{cal2}$, associated with the first and second identified reference positions of the actuator which were considered at steps 100 and 104, are defined by the calibration means 50. These theoretical reference values are defined on the basis of the real positions of the first and second arms 62, 64 of the dummy.

These theoretical values $P_{cal1}$ and $P_{cal2}$ are equal or proportional to the raw values which the potentiometer of an actuator of the family assumed to be ideal should provide when the actuator is in the first identified reference position and in the second identified reference position.

These theoretical values $P_{cal1}$ and $P_{cal2}$ are identical for all the actuators in the family.

At step 110, an affine correction function specific to the actuator in question is set up by the calibration means 50 on the basis of the acquired raw measurement reference values $P_{lue1}$ and $P_{lue2}$ and the theoretical reference values $P_{cal1}$ and $P_{cal2}$.

Figure 4:
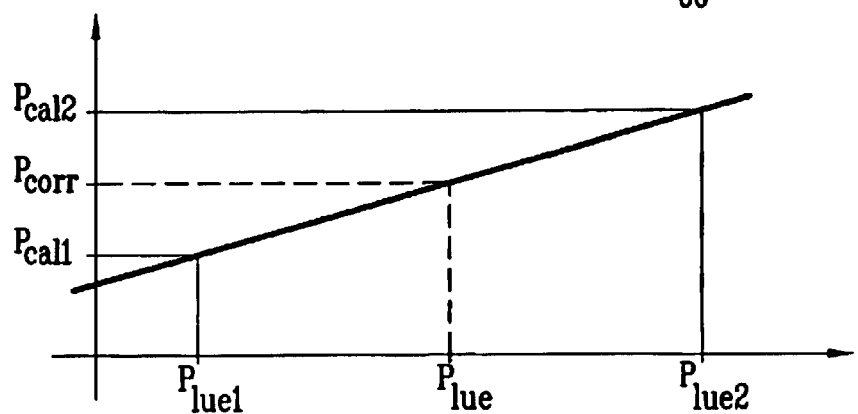
FIG. 4 is a graph illustrating the calculations carried out during the calibration process and during the calculation of corrected position values.

As illustrated in FIG. 4, the calculated affine function corresponds to the equation of the straight line passing through the points of the abscissa ($P_{lue1}$, $P_{cal1}$) and ($P_{lue2}$, $P_{cal2}$) in a graph in which the raw measurement values are plotted on the abscissa and the theoretical values on the ordinate.

The correction function corresponding to the equation of said straight line is expressed by the formula:

$$P_{corr} = P_{lue} - \{a(P_{lue} - P_{cal1}) + b\},$$

where:

$P_{corr}$ is the corrected value corresponding to the raw value which would have been obtained with an ideal actuator and $P_{lue}$ is the current raw measurement value actually acquired.

In the above correction formula, b is expressed by the formula:

$$b = P_{lue1} - P_{cal1},$$

and a is expressed by the formula:

$$a = ((P_{lue2} - P_{cal2}) - b)/(P_{lue2} - P_{lue1}).$$

b corresponds to the initial variance between the real path of the actuator and the theoretical path of an ideal actuator, whilst a corresponds to the difference in gradient between the characteristic gradient of the actuator and the theoretical gradient of an ideal actuator.

At step 112, the calculated affine function enabling a corrected value to be determined for the current position of the actuator on the basis of the raw measurement value provided by the transducer is stored in the memory 48.

The calibrated actuator is then taken down from the dummy and sent for mounting on a seat.

A calibration algorithm of this type based on two sensed values is implemented for each actuator in the family.

Consequently, it will be appreciated that, for the two identified reference positions, all the actuators of the family will provide, at the output of the correction unit 46, the same corrected value representative of the position of the actuator. These corrected values supplied by the actuator are independent of tolerances and mechanical clearances resulting during manufacture of the actuator, as well as any mechanical and electronic inaccuracies in the transducers.

During use, the actuator is such that, at each instant, a raw measurement value is supplied to the data processing unit 47, which determines a corrected value on the basis of the algorithm stored in the memory 48 and in particular on the basis of the affine correction function specific to the actuator.

Since every actuator is individually calibrated, very close corrected values are obtained for a same position of each of the actuators of a same family, whatever the mechanical and electrical inaccuracies of the actuator.

More specifically, the correction algorithm of each actuator is such that the discrepancy between the corrected values supplied by the actuators of a same family for any set of identical positions of the actuators is smaller than the discrepancy between the raw measurement values supplied by the transducers of the same actuators for the same set of identical positions of the actuators.

Once the actuator has been mounted on the seat, the control unit 28 is in a form suitable for implementing a set of control algorithms for each actuator in order either to displace a seat element when prompted by a direct command of the user or to displace this seat element as far as a predetermined target position associated with a predetermined seat configuration required by the user.

Continuous tests are run to sense depression of a button of the key pad 26 corresponding to a direct command for a seat element or to a command for the seat to be placed in a predetermined configuration.

Figure 5:
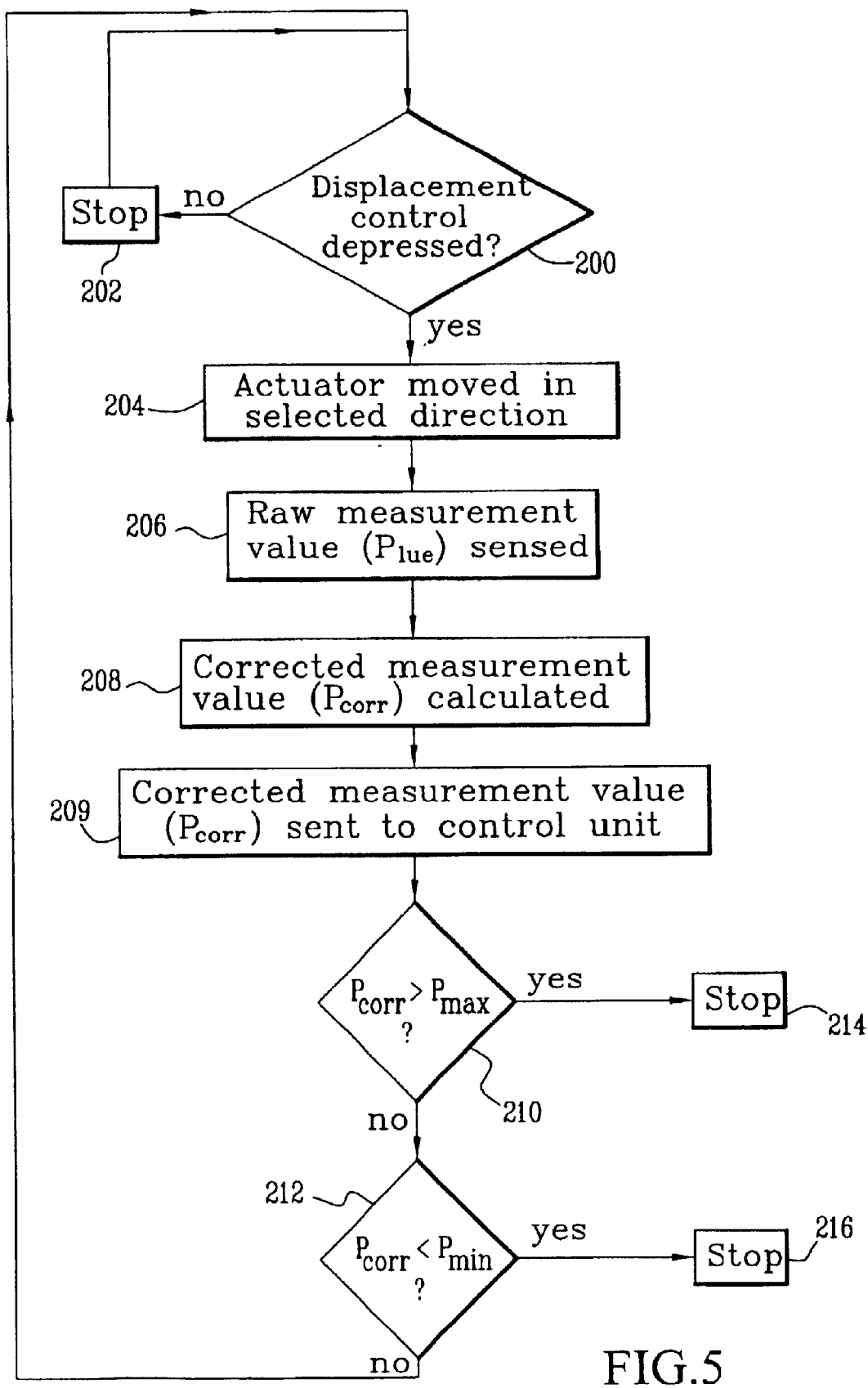
FIG. 5 is a flow chart illustrating how a seat fitted with an actuator as proposed by the invention operates.

FIG. 5 illustrates the algorithm enabling an actuator to be displaced, for example the actuator 24 acting on the leg rest 20.

The test is run at step 200 and determines whether the button specific to the direct command of the actuator in question has been depressed in one direction or another. If such is not the case, the actuator is held in the stopped state at step 202 or the actuator is stopped if it is moving.

If a depressing action prompting a displacement command is detected at step 200, the corresponding actuator is set in motion in the selected direction at step 204.

At step 206, the correction unit 46 takes a reading of the raw measurement value $P_{lue}$. This raw value corresponds to the resistance value of the potentiometer installed on the actuator in question.

At step 208, a corrected measurement value $P_{corr}$ is calculated by the data processing means 47, on the basis of the sensed raw measurement value and the affine correction function stored in the memory 48. This corrected value is sent to the control unit 28 at step 209.

At steps 210 and 212, the driving means 30 compare the corrected measurement value $P_{corr}$ with the displacement limit values of the actuator, denoted by $P_{max}$ and $P_{min}$.

If the corrected measurement value $P_{corr}$ is higher than the value $P_{max}$ or lower than the value $P_{min}$, a command is issued at one of steps 214 and 216 to halt the actuator. In practice, if one of these tests run at steps 210 and 212 is verified, the actuator has reached the end of its travel and it must be stopped.

At the end of test step 212, step 200 is run again so that the series of steps described above is run in a loop.

It will be appreciated that when such an algorithm is implemented, since the tests conducted at steps 210 and 212 are carried out, not on the raw measurement values $P_{lue}$, but on corrected measurement values $P_{corr}$, the implementation of the algorithm does not depend on the manufacturing tolerances of the actuator or any inaccuracies in the transducer integrated in the actuator. The influence of these tolerances and inaccuracies is suppressed because the actuator was calibrated beforehand and this calibration enables tests to be run on values corresponding to theoretical values that would have been encountered with an ideal actuator.

In the example described above, the affine correction function of each actuator is determined on the basis of only two points.

In another embodiment, it is calculated on the basis of more than two points, for example by an algorithm of least squares.

Furthermore, the algorithm illustrated in FIG. 5 is suitable for permitting a comparison between the values of the current consumed by each of the actuators and predetermined threshold values and for issuing a command to stop each actuator if the associated predetermined threshold value is exceeded. Furthermore, the control unit advantageously has means for calculating the cumulative operating time of the actuator from the time the actuator is mounted on the seat and means for counting the number of times it has been operated since it was mounted on the seat.

It will be appreciated that, by using actuators so calibrated, prior to mounting, so that they all supply substantially a same corrected measurement value for a same position, a faulty actuator on a seat can be replaced by an actuator from the same family without the need to modify the programming of the seat, and in particular the control unit 28. After such a replacement, the real positions obtained when a replacement actuator is being controlled will be strictly identical to those obtained with the original actuator.

Figure 6:
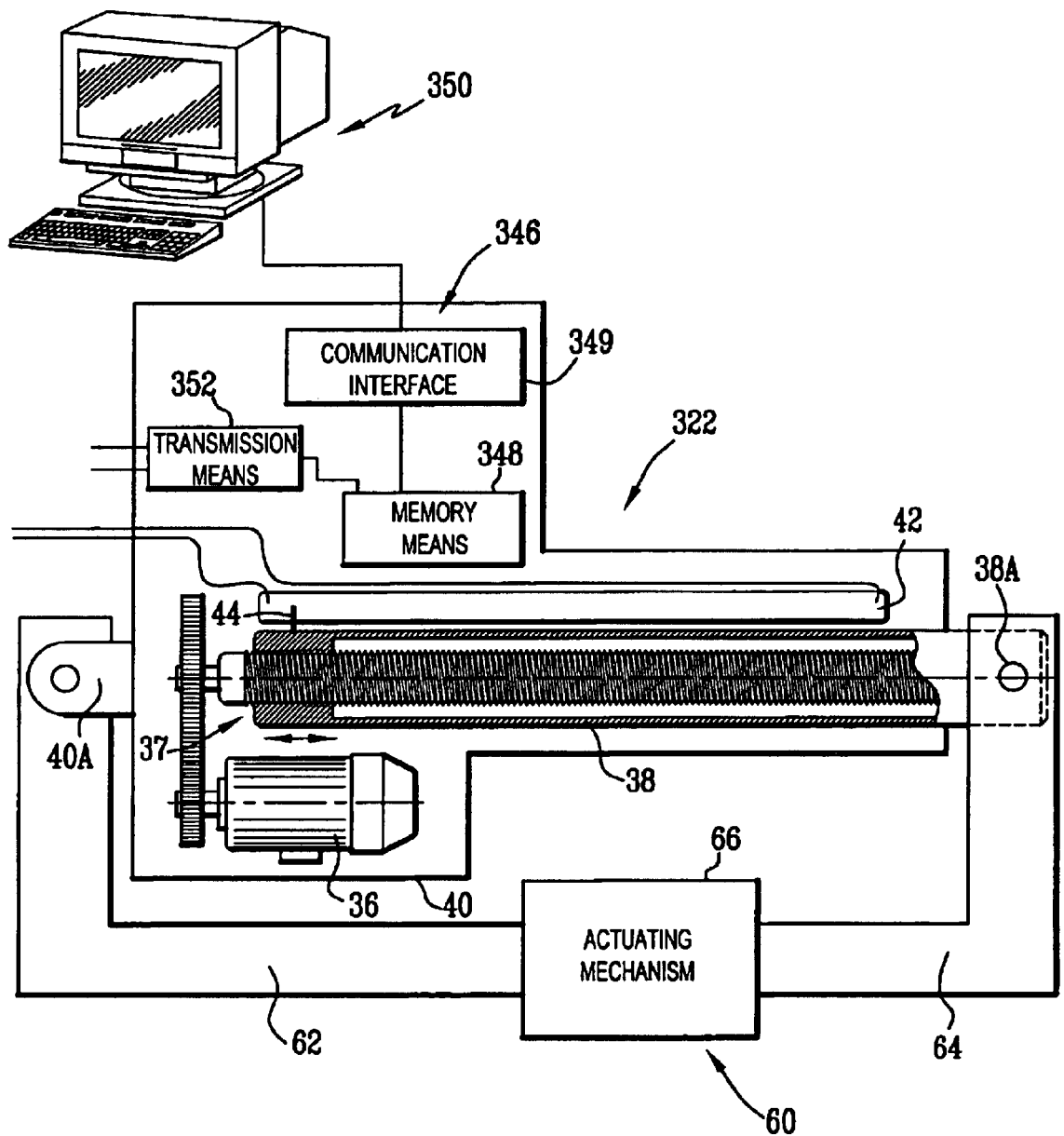
FIG. 6 is a view similar to that shown in FIG. 2, of a different embodiment of an actuator as proposed by the invention during the calibration process.
Figure 7:
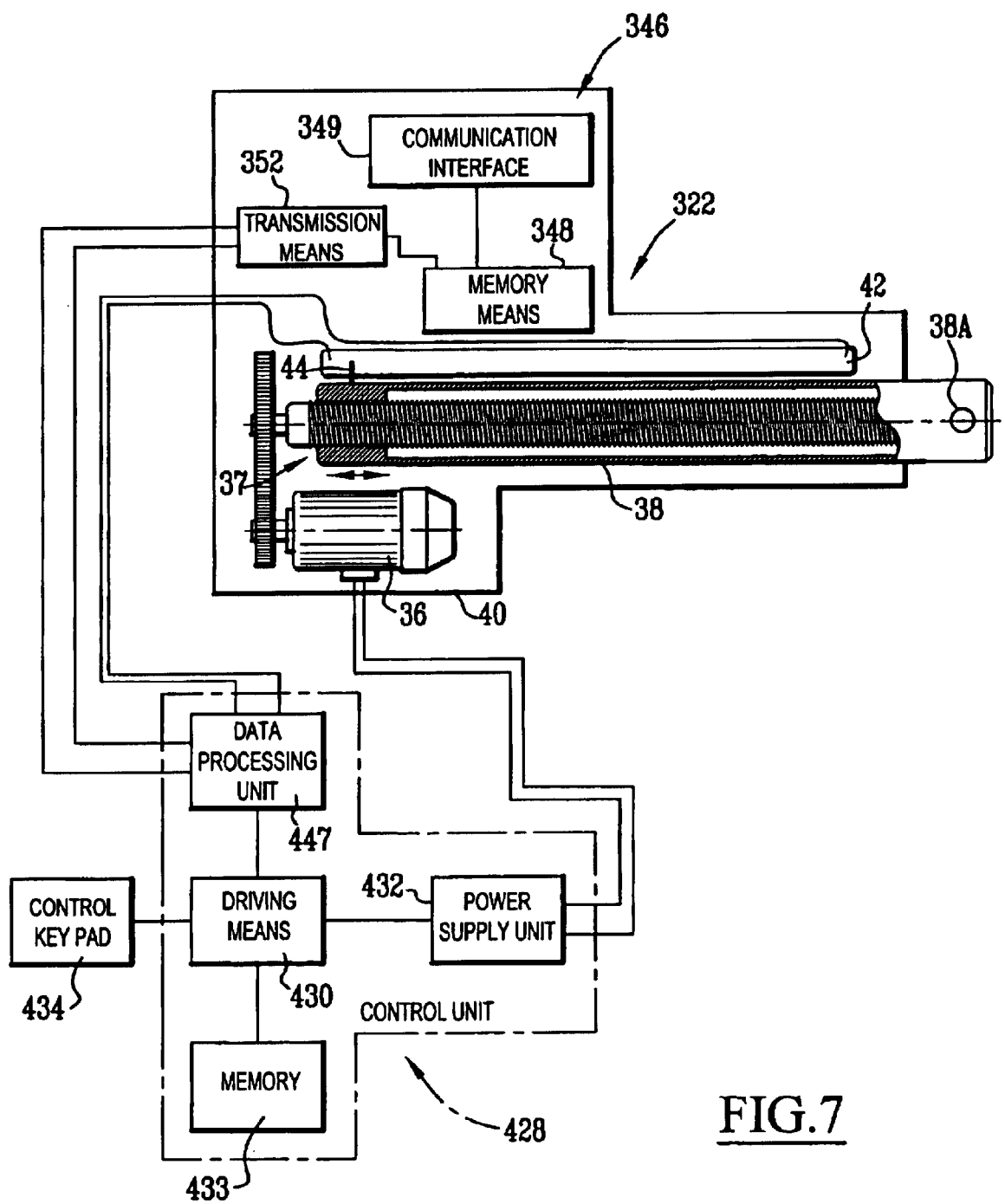
FIG. 7 is a schematic view of an actuating system for a seat as proposed by the invention, incorporating the actuator illustrated in FIG. 6 and a control unit.

FIGS. 6 and 7 illustrate another embodiment of an actuator 122 as proposed by the invention.

The same reference numbers are used for elements in these drawings that are the same as or similar to those of the previous embodiment.

In this embodiment, the actuator shown by 322 has, as before, correction means 346 suitable for defining a correction algorithm specific to said actuator. These correction means 346 have memory means 348 suitable for storing parameters defining the correction algorithm. They also have a communication interface 349 suitable for establishing a temporary link between the memory means 348 and calibration means 350, provided in the form of a computer for example.

The calibration means 350 are suitable for loading parameters defining the correction algorithm into the memory means 348. These parameters are specific to the actuator in question. These parameters include, for example, the parameters a, b and $P_{cal1}$ needed to define the correction formula:

$$P_{corr} = P_{lue} - \{a(P_{lue} - P_{cal1}) + b\}.$$

The correction means 346 also have means 352 for transmitting defining parameters contained in the memory means 348 to a control unit 428 as illustrated in FIG. 7.

As with the previous embodiment, in order to calibrate the actuator 322, it is placed in a dummy 60 which enables the actuator to be moved into two separate positions. The calibration means 350 are suitable for defining parameters defining the correction algorithm a, $P_{cal1}$ and b, on the basis of the sensed raw measurement reference values $P_{lue1}$ and $P_{lue2}$ and the theoretical reference values $P_{cal1}$ and $P_{cal2}$, and for storing its parameters in the memory means 348.

This calibration phase is carried out before the actuator is mounted on the seat.

FIG. 7 illustrates an actuating system having an actuator 322 that has been calibrated beforehand. This actuator is linked to a control unit 428. As with the embodiment illustrated in FIG. 1, this control unit has driving means 430 linked to a power supply unit 432 to which the motor 36 of the actuator is linked. The control unit 428 also has a memory 433 linked to the driving means 430. These driving means 430 are set up so that they are linked to a control key pad 434.

In this embodiment, the control unit 428 also has a data processing unit 447 linked to the driving means 430. The data processing unit 447 is also linked to the transmission means 352 of the actuator and to the transducer 42 of the actuator in order to receive raw measurement values $P_{lue}$.

The data processing unit 447 is suitable for defining a corrected value $P_{corr}$ for the current position of the actuator for each received raw measurement value $P_{lue}$ by implementing the correction algorithm, this algorithm being defined on the basis of the defining parameters a, b, $P_{cal1}$ received from the correction means 346 of the actuator.

The driving means 430 control the actuator in the same way as described with respect to the previous embodiment on the basis of the corrected values for the actuator position.

Also in this embodiment, it should be pointed out that since the actuator has its own correction means 346 enabling the raw measurement values $P_{lue}$ to be corrected so that their values correspond to the corrected position of the actuator, an actuator 322 can be replaced with another actuator from the same family without the need to re-set the control unit 428.

What is claimed is:

1. Actuator for a seat of the type comprising, on the one hand, a body and a control element displaceable relative to the body, under the control of an actuating motor, and, on the other hand, a transducer disposed between the body and the control element, said transducer being suitable for providing a raw measurement value ($P_{lue}$) representative of the current position of the control element relative to the body, wherein said actuator has means for correcting said raw measurement value ($P_{lue}$), said correction means being suitable for defining a correction algorithm which is specific to said actuator and which is suitable for providing a corrected value ($P_{corr}$) for the current position of the actuator on the basis of said raw measurement value ($P_{lue}$), and in that said correction means are specific to said actuator and are integrated therein.

2. Actuator as claimed in claim 1, wherein said correction means have a correction unit specific to said actuator and integrated in said actuator, said correction unit having means for storing said correction algorithm when the actuator is manufactured and a data processing unit suitable for providing said corrected value ($P_{corr}$) by implementing the stored correction algorithm on the basis of said raw measurement value ($P_{lue}$).

3. Actuator as claimed in claim 1, wherein said correction means have means for storing parameters for defining said correction algorithm and means for transmitting said defining parameters to a control unit of the actuator capable of implementing the correction algorithm on the basis of said defining parameters.

4. Actuator as claimed in claim 1, wherein said actuator is isolated from a seat before being mounted on the seat.

5. Actuator as claimed in claim 1, wherein said correction algorithm depends solely on the structural characteristics specific to said actuator and is independent of the structure of the seat for which it is intended.

6. Actuator as claimed in claim 1, wherein said correction algorithm is suitable for calculating the corrected value ($P_{corr}$) as the image of the raw measurement value ($P_{lue}$) by means of an affine correction function.

7. Actuating system for a seat, comprising at least one actuator as claimed in claim 3, and a control unit for the or each actuator, which control unit is linked to the or each actuator so as to receive from the or each actuator the raw measurement value ($P_{lue}$) and said defining parameters for the algorithm, and in that the control unit has a data processing unit suitable for providing said corrected value ($P_{corr}$) on the basis of said received raw measurement value ($P_{lue}$) by implementing the correction algorithm on the basis of said received parameters defining the algorithm.

8. Actuating system for a seat, comprising at least one actuator as claimed in claim 4, and a control unit for the or each actuator, which control unit is linked to the or each actuator so as to receive from the or each actuator the raw measurement value ($P_{lue}$) and said defining parameters for the algorithm, and in that the control unit has a data processing unit suitable for providing said corrected value ($P_{corr}$) on the basis of said received raw measurement value ($P_{lue}$) by implementing the correction algorithm on the basis of said received parameters defining the algorithm.

9. Actuating system for a seat, comprising at least one actuator as claimed in claim 5, and a control unit for the or each actuator, which control unit is linked to the or each actuator so as to receive from the or each actuator the raw measurement value ($P_{lue}$) and said defining parameters for the algorithm, and in that the control unit has a data processing unit suitable for providing said corrected value ($P_{corr}$) on the basis of said received raw measurement value ($P_{lue}$) by implementing the correction algorithm on the basis of said received parameters defining the algorithm.

10. Actuating system for a seat, comprising at least one actuator as claimed in claim 6, and a control unit for the or each actuator, which control unit is linked to the or each actuator so as to receive from the or each actuator the raw measurement value ($P_{lue}$) and said defining parameters for the algorithm, and in that the control unit has a data processing unit suitable for providing said corrected value ($P_{corr}$) on the basis of said received raw measurement value ($P_{lue}$) by implementing the correction algorithm on the basis of said received parameters defining the algorithm.

11. Family of actuators, wherein said family comprises several actuators as claimed in claim 1, and in that the correction algorithm of each actuator is such that, for at least one predetermined relative position of the control element by reference to the body, said corrected values ($P_{corr}$) provided by all the actuators of the family are equal to a same predetermined value.

12. Family of actuators as claimed in claim 11, wherein the correction algorithm of each actuator is such that, for at least two predetermined relative positions of the control element by reference to the body, said corrected values ($P_{corr}$) provided by all the actuators of the family are equal to a same predetermined value.

13. Family of actuators as claimed in claim 11, wherein the correction algorithm specific to each actuator is such that the discrepancy between the corrected values ($P_{corr}$) provided by the actuators of the family for any set of identical positions of the actuators is smaller than the discrepancy between the raw measurement values ($P_{lue}$) provided by the transducers of the same actuators for the same set of identical positions of the actuators.

14. Family of actuators as claimed in claim 12, wherein the correction algorithm specific to each actuator is such that the discrepancy between the corrected values ($P_{corr}$) provided by the actuators of the family for any set of identical positions of the actuators is smaller than the discrepancy between the raw measurement values ($P_{lue}$) provided by the transducers of the same actuators for the same set of identical positions of the actuators.

15. Method of manufacturing an actuator intended for mounting on a seat, the actuator comprising, on the one hand, a body and a control element which can be moved relative to the body under the control of an actuating motor, and, on the other hand, a transducer disposed between the body and the control element, said transducer being suitable for providing a raw measurement value ($P_{lue}$) representative of the current position of the control element relative to the body, wherein means for correcting said raw measurement value are integrated in the actuator, said correction means being suitable for defining a correction algorithm which is specific to said actuator and which is suitable for providing a corrected value ($P_{corr}$) for the current position of the actuator on the basis of said raw measurement value ($P_{lue}$), and in that it includes a phase during which the correction algorithm defined by said correction means is customised for the specific actuator before the actuator is mounted on the seat.

16. Method as claimed in claim 15, wherein said phase of customising the correction algorithm includes the steps of:

positioning the control element relative to the body in at least one predetermined position;

reading the raw measurement value ($P_{lue1}$, $P_{lue2}$) provided by the transducer for the or each predetermined position; and determining the correction algorithm on the basis of the or each raw measurement value ($P_{lue1}$, $P_{lue2}$) read.

* * * * *